July 10, 1928.
J. S. GAULT
1,676,823
SNOW REMOVER
Filed April 25, 1927    3 Sheets-Sheet 1
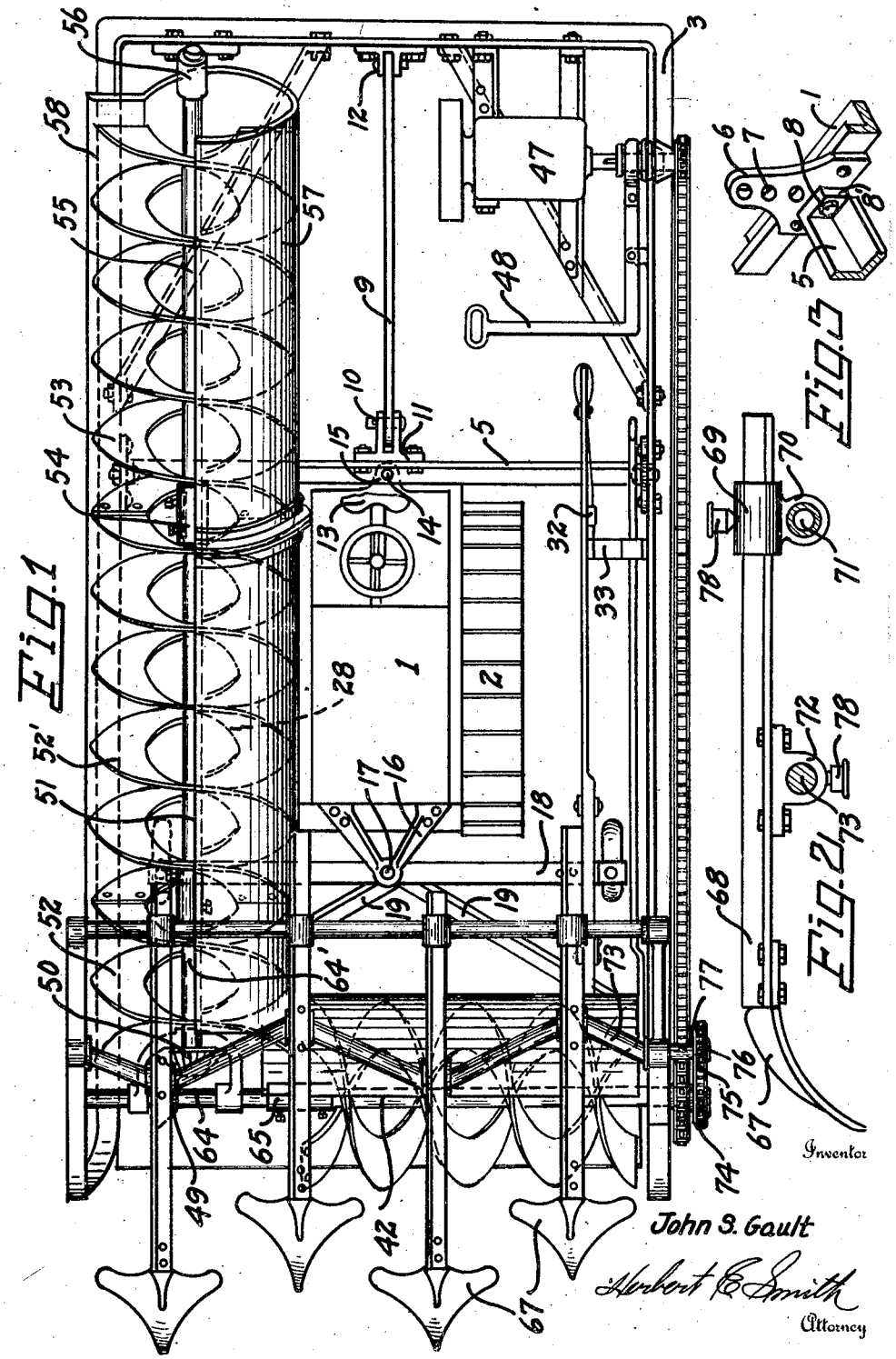
Inventor
John S. Gault
Herbert R. Smith
Attorney July 10, 1928.
J. S. GAULT
1,676,823
SNOW REMOVER
Filed April 25, 1927
3 Sheets-Sheet 2
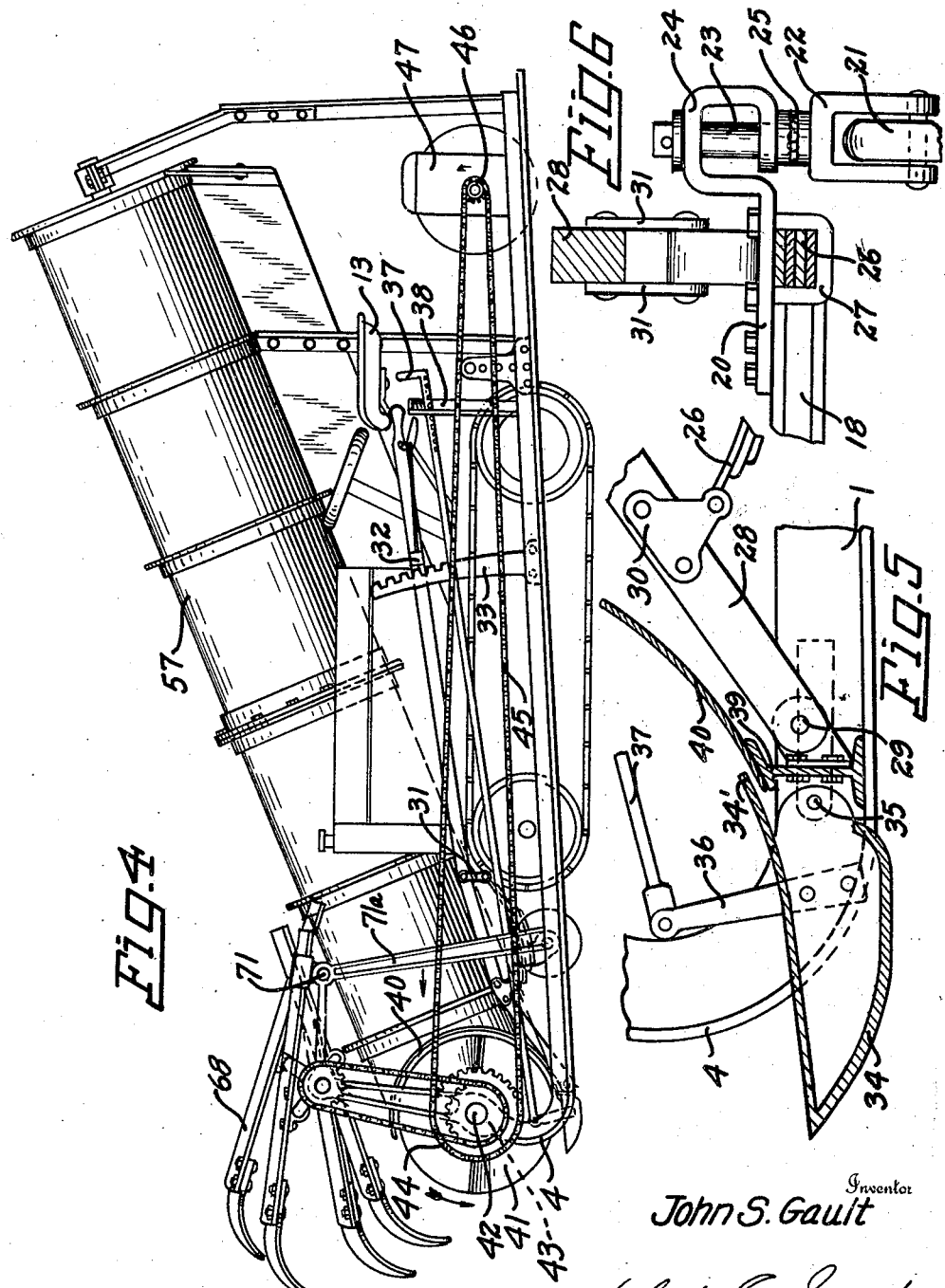
Inventor
John S. Gault
By Herbert E. Smith
Attorney July 10, 1928.
J. S. GAULT
SNOW REMOVER
Filed April 25, 1927
1,676,823
3 Sheets-Sheet 3
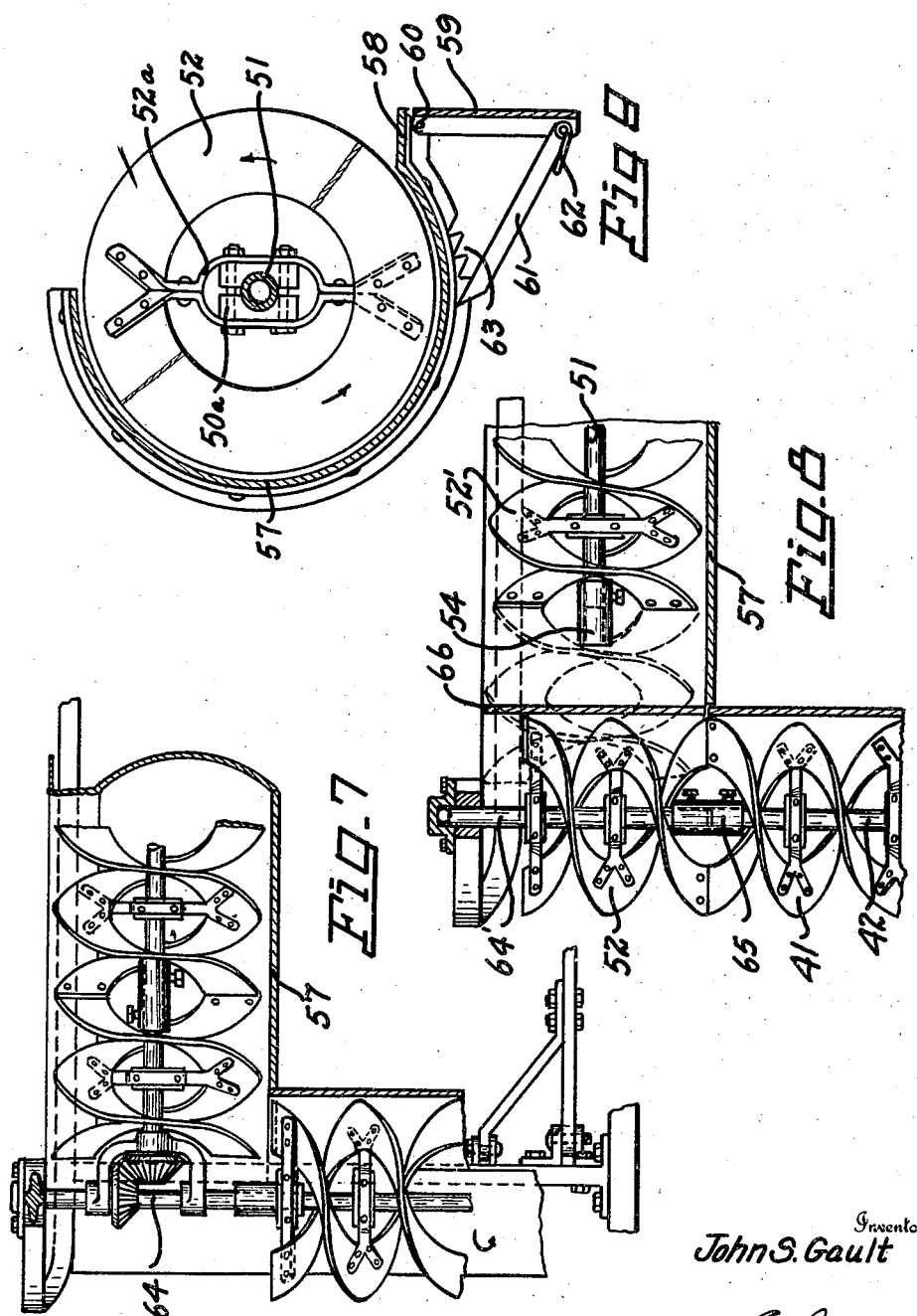
Inventor
John S. Gault
By Herbert E. Smith
Attorney Patented July 10, 1928.

1,676,823

UNITED STATES PATENT OFFICE.

JOHN S. GAULT, OF ATHOL, IDAHO.

SNOW REMOVER.

Application filed April 25, 1927. Serial No. 186,281.

My present invention relates to improvements in snow removers of the automotive implement type designed for removing snow from streets, highways, roads, etc., and depositing the snow at the side of the roadway. The implement is designed for use with a tractor or truck, and in the present exemplification of the invention the implement is shown in connection with a tractor of standard type utilizing traction belts in the place of traction wheels. The implement may with facility be coupled to or uncoupled from the tractor, and means are provided whereby the snow remover may be adjusted to various sizes of tractors. In carrying out my invention I utilize a transversely disposed rotary conveyer for the removal of the snow and combine with it a rotary conveyer or elevator disposed at right angles to the front, transverse conveyer, or parallel with the longitudinal axis of the implement whereby the snow may be disposed of at the side of the road. Various changes may be made in the two rotary conveyers for adapting the implement to heavy or light duty in the removal of the snow, and for this purpose the rotary conveyers are made up of interchangeable, standardized parts that permit the changes to be made with facility and convenience. The invention consists in certain novel combinations and arrangements of parts as will hereinafter to be more specifically set forth and claimed. In the accompanying drawings I have illustrated one complete example of the physical embodiment of my invention and a modification thereof, wherein the parts are combined and arranged according to the best mode I have thus far devised for the practical application of the principles of my invention.

Figure 1 is a top plan view of the implement adapted for use when the snow is deep on the roadway, and adapted to convey and distribute the snow at the roadside.

Figure 2 is a detail side view of one of the oscillating shovels used at the front of the implement for breaking into frozen or packed snow and feeding the snow to the transversely arranged, front rotary conveyer.

Figure 3 is a detail perspective view of a pivotal arrangement between the main frame of the implement and the rear transverse draw bar of the tractor, two of these pivots being used.

Figure 4 is a view in side elevation of the implement of Figure 1.

Figure 5 is an enlarged sectional detail view of the transversely arranged plow or shoe at the front of the implement showing also part of the suspending frame of the implement.

Figure 6 is a detail view partly in section showing one of a pair of caster wheels and part of the suspending frame.

Figure 7 is a detail plan view, partly in section showing the co-operation of the angularly disposed conveyers at the right front end of the implement.

Figure 8 shows a modified form of the invention where only the front, transverse, rotary conveyer is being used, as in light snows. Figure 9 is a sectional detail view through the elevator-conveyer showing an adjustable guard or shield plate used for packing the removed snow at the right side of the road.

As exemplified in the drawings the implement is a practical machine, light in weight, light running, and simple in construction and operation, being provided with a power plant for operating its conveyers, and having control means readily accessible to the driver of the vehicle. For propelling the snow remover along the roadway I have illustrated a standard type of tractor indicated by the numeral 1 and provided with the usual traction belts 2 of the caterpillar type. The tractor is located in the midst of a main frame 3 of rectangular shape, which is of the required strength and well bolted and braced for the purpose of supporting the two rotary conveyers and accessory parts.

At the rear of the tractor the main frame is coupled thereto by means of a transverse draw bar 5, at the ends of which are provided two vertical plates 6, 6, each having a vertical row or series of bolt holes 7 to accommodate the pivot bolts 8. These pivot bolts 8 pass through end flanges 8' of the transverse draw bar 5, through the vertical plates, and as in Figure 3, sometimes through the side bars of the main frame 1. The pivot bolts may be used in connection with a selected hole 7 of the plates to adjust the main frame in desired position with relation to the draw bar 5 and its tractor. The rear end of the main frame is braced or strengthened by means of a longitudinally disposed draw link 9 which is coupled by its pin 10 to a bracket 11 on the transverse draw bar 5, and the rear end of the link is bolted at 12 to the rear end bar of the main frame.

The driver of the implement or vehicle occupies the seat 13 located just above the coupling bolt 14 that secures the rear draw bar to the tractor bracket 15. At the front of the tractor an attaching bracket 16 is provided, and a bolt 17 is passed through this bracket and the front transverse bolster 18, from which extend a pair of diagonal braces 19 to the front corners of the main frame.

As best seen in Figure 6, the ends of the bolster 18 are provided with plates 20 and these plates are the means of supporting the pair of caster wheels 21 journaled in yokes 22 and provided with spindles 23 that are journaled in housings or bearings 24 fashioned at the end of the end plates. Ball bearings are indicated at 25 to facilitate freedom of movement of the caster wheels, and these wheels it will be apparent are for the purpose of supporting the front end of the inclined main frame, together with the two pivotal bolts 8 at the ends of the rear draw bar of the tractor.

The bolster is pivoted on the bracket 16 that is rigid with the tractor as is also the bracket 15 of the rear draw bar 5, while the main frame is pivoted on a transverse axis, with a suspension frame connecting the main frame and bolster ends. The tractor is therefore in an intermediate position to impart a direct pull and a direct push on the implement, the power thus applied being directly along the approximate longitudinal center of the implement. This suspension frame comprises a pair of semi-elliptic leaf springs 26 secured to the end plates of the bolster by U-bolts 27, and two suspension levers or arms 28 are located above the springs and pivoted at their front ends at 29 to the main frame. The front ends of the springs are pivoted to hangers 30 on these suspension levers and the rear ends of the springs are pivotally connected to the levers by shackles 31. The rear, free ends of the suspension levers may be raised or lowered to adjust the front end of the main frame with relation to the road surface, and for holding these levers in fixed, adjusted position I utilize pawls 32 for engagement with the rack bars 33 fixed on the side bars of the main frame.

Across the front of the machine and supported in the main frame above the turned up or curved front ends 4, is a horizontal, transversely arranged screw conveyer 41 that turns anti-clockwise, as indicated by the arrow in Figure 4 for conveying the snow from left to right as the implement advances along the roadway. If the snow is of comparatively light depth, only the transverse rotary conveyer is utilized, as seen in Figure 8, but when the snow is of greater depth, both the transverse conveyer and the longitudinally disposed conveyer are used for handling the snow.

In connection with the transverse rotary conveyer I utilize a ground shoe 34 pivoted at its ends at 35 in the front of the main frame and extending transversely from side to side of the frame, to form a scoop or shovel for the snow in co-action with the rotary conveyer or screw 41. By means of crank arms 36 fixed to the scoop, pivoted rack levers 37 connected to the arms, and rack bars 38 fixed to the main frame side bars, the scoop may be adjusted on its pivots or hinges 35 and retained in adjusted position. At its rear the scoop is hinged to a transversely extending I-beam 39 by means of suitable brackets, and the rear edge 34' of the scoop overlaps the front lower end of the guide plate 40. This guide plate which is attached to the I-beam is of semi-cylindrical shape to conform to the shape of the screw conveyer 41 with which it co-acts in the moving of the snow from left to right as the implement advances along the roadway and the screw conveyer cuts into and removes the snow.

The rotary conveyer 41 which is made up of open center, or annular blades, is supported on and revolves with a horizontal shaft 42 journaled in bearings 43 of the main frame, and this shaft is driven through its sprocket wheel 44, chain 45, and sprocket wheel 46 of the motor 47, a clutch mechanism being indicated at 48 for controlling the operation of the shaft.

The shaft 42 is also used to operate the elevator-conveyer at the side of the implement through a gear couple comprising a bevel gear 49 on shaft 64 forming an extension of shaft 42, and gear 50 on section 64' of the rotary elevator shaft, the other sections of this shaft being designated 51 and 55. The rotary or screw elevator is made up of three sections as 52, 52' and 53 which are separable and their respective shaft sections 64' 51 and 55 are also separable or detachable and provided with slip couplings indicated at 54, and of course the rigid shaft sections are journaled in bearings as 56. The screw conveyer or elevator as best seen in Figure 4 is partly enclosed with an inclined hood 57, the latter being open toward the road side and provided with a flat chute or plate 58 over which the snow is pushed by the spirally arranged or screw blades of the elevator.

For packing the snow to prevent it falling to the road level after being pushed over the chute 58, I utilize a longitudinally extending plate 59 hinged beneath the chute 58 at 60 and held in adjusted position by means of braces or pawls 61 hinged or pivoted at the free edge of the plate 59, and these pawls or braces are held in proper position by springs 62 to engage a selected tooth of the rack 63 to retain the plate 69 in adjusted position for rubbing against the snow bank and packing the snow as it is pushed laterally from the hood of the rotary elevator.

In Figure 8 the elevator is not in use, and the transverse rotary conveyer is used to convey a light snow to the right side of the roadway. As shown the lower, short flight or section 52 and its shaft 64' have been removed from the conveyer, the shaft section secured by slip-coupling 65 to the shaft section, and the conveyer section is secured to the section 41. An extension guide plate 66 is added to the transverse hood 40 for co-action with the added flight or section 52, and the snow is conveyed to the right as the implement advances and pushed out at the right end of the hood 40—66.

In some instances the length of the conveyer-elevator may be changed as by removing one of the sections, as 53 when not needed.

In Figure 9 the means of attaching or supporting the screw sections from their shaft sections is illustrated where clamp blocks 50ª are secured about the shaft section (here shown as hollow or tubular) by means of bolts passed through a pair of straps 52ª, and the ends of these pairs of straps are rigidly attached at diametrically opposite points of the screw blade.

To facilitate the removal of the snow when it has reached considerable depth I utilize a series of oscillating shovels as 67 carried at the front ends of arms 68 that slide in guide bushings 69. The bushings are provided with angularly disposed sleeves 70 that oscillate on a cross bar 71 that forms part of a frame 71ª rigid with the main frame. Each arm 68 has a bearing block or journal block 72 on the crank shaft 73, and this crank shaft is driven from the conveyer shaft 42 by means of a sprocket wheel 74, chain 75, and sprocket 76 on the crank shaft. The crank shaft is journaled in bearings 77 of the frames 71ª above and a little to the rear of the rotary conveyer, and the shovels 67 reach out in front of the rotary conveyer to pull in the snow toward the conveyer. By the action of the crank shaft the shovel end of the arms is caused to swing with the pivotal center on the rod or bar 71, and the movement of the crank bearing 72 of the arm is compensated for by the slide action of the rear end of the arm in the bushing 69, the parts being oiled as usual by means of oil cups as 78. The oscillating shovels are especially useful in breaking down a snowbank, as in a cut through which the road passes, and they shovel the snow onto or in front of the transverse conveyer so that the latter may convey it to the right side of the road.

The implement is steered by the movement of the tractor and the latter is steered in usual manner by the driver of the vehicle, while the caster wheels of the main frame permit smooth movement of the frame and parts supported thereby.

Having thus fully described my invention, what I claim as new and desire to secure by Letters Patent is:—

1. In a snow remover the combination with an open main frame and conveyers thereon, of a tractor within the frame, a rear draw bar pivoted on the tractor and pivotal connection between said bar and the main frame, a front bolster pivoted on the tractor and caster wheels at the ends of said bolster, a suspension frame comprising side levers pivoted to the main frame and means for securing the free ends of said levers to the main frame, suspension springs at the ends of the bolster, and pivotal connections at the ends of said springs to said levers.

2. In a snow remover, the combination with an adjustable main frame having an adjustable, transversely arranged scoop and an open front-semi-cylindrical hood, of a screw conveyer above the scoop in operative arrangement with the hood, means for operating the screw conveyer, an upwardly inclined hood at one side of the frame having an open outer side and a screw conveyer in operative arrangement with the inclined hood, and driving connections between said screw conveyers.

3. In a snow remover the combination with an adjustable main frame having an adjustable transversely arranged scoop and an open front semi-cylindrical head, of a screw conveyer above the scoop in operative arrangement with the hood, means for operating the screw conveyer, an upwardly inclined hood at one side of the frame having an open outer side, a hinged packing plate suspended from the side of the hood and means for retaining said plate in adjusted position, a screw conveyer in operative arrangement with said inclined hood, and driving connections between said conveyers.

In testimony whereof I affix my signature.

JOHN S. GAULT.